(12) United States Patent
Diebold et al.

(10) Patent No.: US 7,074,161 B2
(45) Date of Patent: Jul. 11, 2006

(54) METHOD FOR ASSISTING A VEHICLE TO START ON A SLOPE

(75) Inventors: Jürgen Diebold, Eschborn (DE); Oliver Huth, Kronberg (DE)

(73) Assignee: Continental Teves, Inc., Auburn Hills, MI (US)

( * ) Notice: Subject to any disclaimer, the term of this patent is extended or adjusted under 35 U.S.C. 154(b) by 145 days.

(21) Appl. No.: 10/477,276

(22) PCT Filed: Apr. 30, 2002

(86) PCT No.: PCT/EP02/04754

§ 371 (c)(1),
(2), (4) Date: Nov. 10, 2003

(87) PCT Pub. No.: WO02/090158

PCT Pub. Date: Nov. 14, 2002

(65) Prior Publication Data

US 2004/0147368 A1 Jul. 29, 2004

(30) Foreign Application Priority Data

May 8, 2001 (DE) ............................... 101 22 328
Jun. 28, 2001 (DE) ............................... 101 31 291

(51) Int. Cl.
*B60K 41/20* (2006.01)
(52) U.S. Cl. ..................................................... 477/184
(58) Field of Classification Search ................ 477/182, 477/183, 184
See application file for complete search history.

(56) References Cited

U.S. PATENT DOCUMENTS

| | | | | |
|---|---|---|---|---|
| 4,717,207 A | * | 1/1988 | Kubota et al. ................. | 303/3 |
| 5,484,044 A | * | 1/1996 | Bursteinas et al. ......... | 188/353 |
| 5,916,062 A | * | 6/1999 | Siepker ...................... | 477/184 |
| 6,150,780 A | * | 11/2000 | Young et al. ............... | 318/270 |
| 6,416,441 B1 | * | 7/2002 | Eckert et al. .............. | 477/185 |

FOREIGN PATENT DOCUMENTS

| | | |
|---|---|---|
| DE | 19520579 | 12/1995 |
| DE | 19630870 | 2/1998 |
| DE | 19849799 | 6/2000 |
| EP | 0492199 | 7/1992 |
| EP | 0939212 | 9/1999 |
| WO | 9920921 | 4/1999 |

OTHER PUBLICATIONS

Patent Abstracts of Japan, vol. 1995, No. 06, Jul. 31, 1995 & JP 07 069102 (Toyota Motor Corp.), Mar. 14, 1995 (Abstract).

* cited by examiner

*Primary Examiner*—Sherry Estremsky

(57) ABSTRACT

In a method and a device for assisting a vehicle to start on a slope, a vehicle brake torque is changed corresponding to an estimated vehicle driving torque in consideration of a downgrade torque. The method is executed with the following steps of determining a vehicle driving torque reference value, comparing the reference value with the estimated vehicle driving torque, and influencing the brake torque in accordance with the comparison result (FIG. 1).

21 Claims, 7 Drawing Sheets

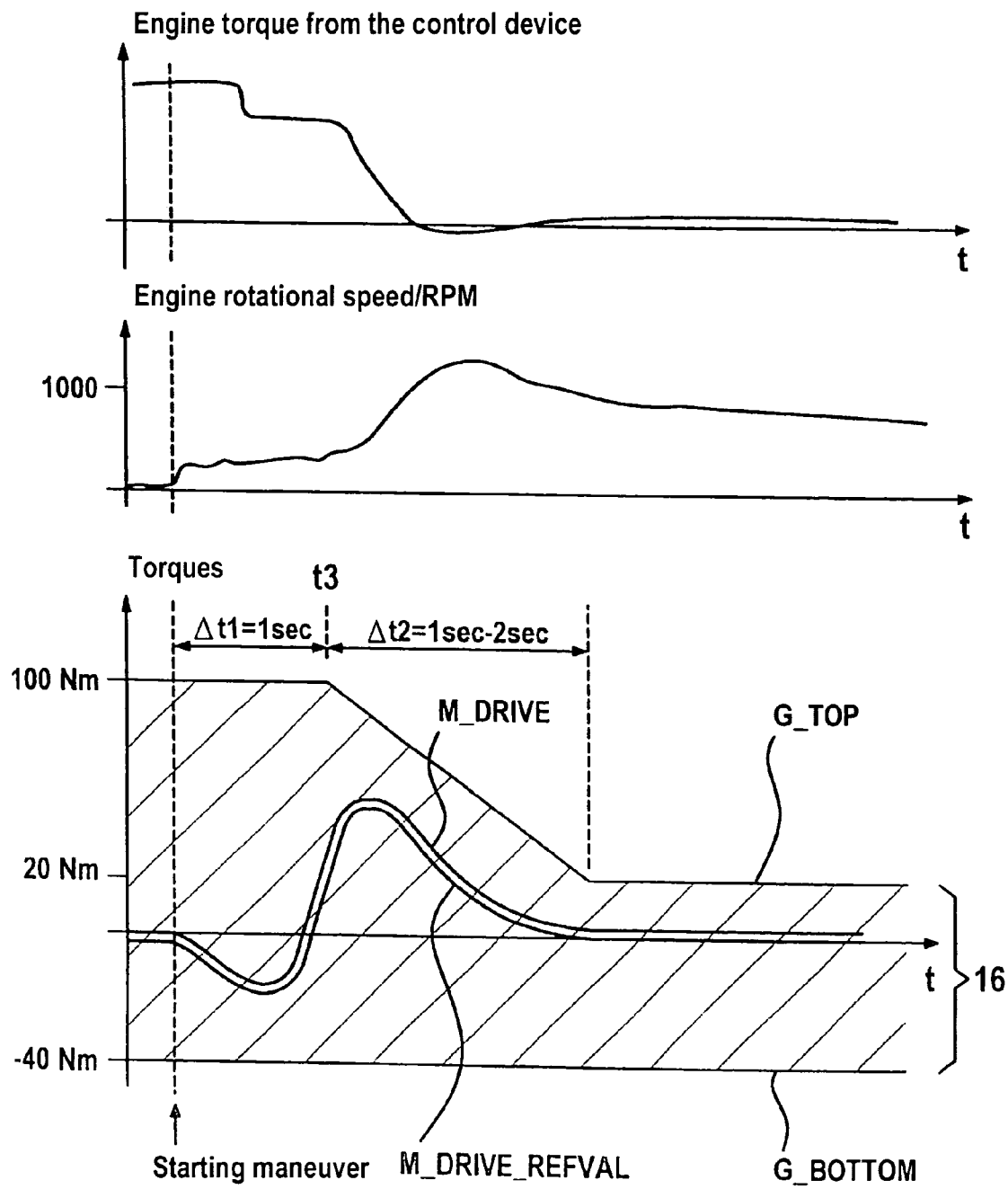
Fig. 5 (Starting maneuver of the internal combustion engine)

METHOD FOR ASSISTING A VEHICLE TO START ON A SLOPE

BACKGROUND OF THE INVENTION

The present invention relates to a method for assisting a vehicle to start on a slope wherein a vehicle brake torque is changed corresponding to an estimated vehicle driving torque in consideration of a downgrade torque.

The term 'starting on a slope' implies starting to drive uphill and downhill as well as starting to drive on a horizontal roadway.

A starting aid is meant to assist the driver when starting to drive uphill. The purpose of starting aids when driving uphill is to simplify the complicated handling of brake, parking brake, clutch and engine. In addition, the vehicle must be prevented by all means from rolling backwards in order to avoid e.g. a collision with vehicles positioned downhill. To this end, an assistance system of this type is required to determine the driving torque transmitted by way of the clutch to the driving axle apart from the downgrade torque and the brake torque.

WO99/20921 discloses a method, which in accordance with the determined driving torque and the determined downgrade torque, influences the brake torque in such a manner that when starting to drive uphill the sum of brake torque and determined driving torque will always exceed the downgrade torque. In this arrangement, the estimation of the driving torque is evaluated directly, that means absolutely, in an observer.

The shortcoming of this method is that errors that possibly exist in the driving torque estimation will be included in the balancing operation, and a premature or too late release of the brake will occur during the starting maneuver depending on the type of error. When there are errors in determining the driving torque, the vehicle will consequently roll away in opposition to the desired driving direction (brake is released too early), or the vehicle is held in position too long and the driver is hindered when starting to drive.

Possible errors in determining the driving torque may be due to the following causes:

- Mechanically and/or electrically induced loads in the vehicle are not taken into account in the model-based determination of the driving torque. These loads may be powerful electric consumers such as a seat heating, or other retrofitted accessories.
- The internal combustion engine installed into the vehicle has a definitely different friction torque compared to other engines of the same construction (production variations, aging, etc.).
- Additional torques (such as ISAD moment, load moment of the air-conditioning compressor, etc.) of already provided control devices are determined and made available. However, said additional torques may be faulty. For example, the load moment of the air-conditioning compressor is mostly considered only as a static maximum value in the lost torque supplied by the engine control unit.

An object of the present invention is to disclose a more accurate method for assisting a vehicle to start and to provide a corresponding device.

SUMMARY OF THE INVENTION

According to the present invention, this object is achieved by implementing the generic method with the following steps: determining a vehicle driving torque reference value, comparing said reference value with the estimated vehicle driving torque, and influencing the brake torque in accordance with the comparison result.

Favorably, this will achieve:
- a relative evaluation of the estimated driving torque,
- determining a reference value for the relative evaluation.

The relative evaluation of the estimation of the driving torque is advantageous for a starting aid in comparison to the absolute evaluation because the absolute change of the driving torque is different in each vehicle. The different friction torques existing in different vehicles, the different accessories and different loads that are not modeled can be taken into account by the relative evaluation because only the difference between the vehicle driving torque and the vehicle driving torque reference value determined according to defined conditions is included in the balancing operation. The determined vehicle driving torque reference value is an offset value of the vehicle driving torque, which value depends on conditions and in which vehicle-related load moments are included. Thus, the behavior of the vehicle will always be the same for the driver, irrespective of different load moments. This means the driver is equally assisted in the starting maneuver in a thereby reproducible manner, irrespective of whether the engine is cold and causes more friction torque than the engine control device estimates or other additional load moments exist which are not included in the estimation of the vehicle driving torque (M_DRIVE).

The relative evaluation of the driving torque estimation will not make the starting aid cause a too early or too late release of the brake in the starting maneuver.

Another objective of the invention is to equip a generic device for assisting the vehicle to start on a slope, wherein a vehicle brake torque is changed corresponding to an estimated vehicle driving torque in consideration of a downgrade torque, with a determining unit for determining a vehicle driving torque reference value, a comparison unit for comparing the reference value with the estimated vehicle driving torque, and a device for influencing the brake torque according to the result of comparison.

It is favorable that the vehicle driving torque reference value is determined according to the vehicle driving torque.

Further, it is favorable that the reference value of the vehicle driving torque is evaluated in dependence on further quantities or parameters or measured variables or their derivatives, such as quantities representative of the release of the brake pedal and/or the application of the accelerator pedal and/or the instantaneous vehicle condition (standstill, starting to drive, cranking the engine, engine rotational speed, etc.). It is thereby possible to correct the inaccuracies of the estimated vehicle driving torque or of the reference value, which occur in special driving situations and/or with special driving conditions. One example of this is a limitation of the engine rotational speed, which in the model-based estimation of the driving torque according to WO99/20921 can lead to an estimated driving torque in the idling model that is, however, not available on the driven wheels. Express reference is made to the specification of the aforementioned document in its entirety.

To better improve assisting the drive-off it is expedient that the vehicle driving torque reference value within a tolerance band is adapted to the vehicle driving torque until the brake pedal and/or the parking brake is released. A tolerance band within which the reference value follows the driving torque permits appropriately eliminating the errors in the driving torque estimation. On the other hand, the driver can start in opposition to a parking brake that is insufficiently applied. The tolerance band limit values restrict the adaptation of the reference value to physically appropriate values.

In another embodiment it is favorable that the vehicle driving torque reference value within the tolerance band follows the vehicle driving torque also towards the bottom tolerance band limit value when at least the brake pedal (and also the parking brake, as the case may be) was released. The result is that when stopping a starting maneuver while driving torque has already developed, with the brake applied, the reference value is not maintained at the previously reached high value, from which a new drive-off detection begins, but the reference value again follows the driving torque downwards to the lower value. This avoids loss in comfort like a too long holding of the vehicle in position when the driver has the desire to start.

When the actuation of the parking brake is integrated into the method and the device for aiding the drive-off, it is possible to apply the method steps and the device directed to a release of the service brake also when releasing the parking brake.

Further, it is advantageous that the vehicle driving torque reference value within the tolerance band follows the vehicle driving torque in dependence on an accelerator pedal quantity until the bottom tolerance band limit value when at least the brake pedal was released.

It is especially appropriate that the vehicle driving torque reference value is adapted to the bottom tolerance band limit value only after a predetermined time period, with said time period being started in response to the accelerator pedal quantity and/or in response to a limit value of the engine rotational speed.

In addition, it is favorable that the vehicle driving torque reference value within the tolerance band follows the vehicle driving torque also with limited gradients towards the top or bottom tolerance band limit value when the brake pedal was released. It is taken into account in this method step that additional loads, which cannot be considered in the model-based determination of the driving torque, will cause an undesirable deactivation of the device. The reference value may therefore be adapted within its tolerance band, and the speed of this adaptation is limited.

Advantageously, the limited gradients are determined according to the variation of the vehicle driving torque.

The vehicle driving torque reference value will then follow the vehicle driving torque again when the vehicle driving torque moves continuously in the direction of the bottom limit of the tolerance band after it fell below the value of the vehicle driving torque reference value, which itself can follow this change only with a limited gradient.

Besides, it is favorable that the vehicle driving torque reference value follows the vehicle driving torque with limited gradients to the top or bottom tolerance band limit value only if the accelerator pedal quantity represents an instantaneous vehicle condition in which the accelerator pedal is released. It is thereby avoided that drive-off is delayed. In addition, the condition must favorably be satisfied that the engine rotational speed falls below the limit value.

As the starting assistance can be initiated automatically when entry conditions prevail, upon starting the vehicle—when the estimation of the driving torque is very faulty—it is favorable that at least the top tolerance band limit value for the vehicle driving torque reference value is raised during starting for a time period which can be described by way of tables based on experience values or by constants or formulas which take into consideration the starting maneuver in connection with characteristics/parameters of the vehicle. The vehicle driving torque reference value is thereby adapted to the faulty vehicle driving torque in the starting phase. This measure allows excluding the determination of a faulty starting condition.

Because the estimation of the vehicle driving torque can also become faulty when the driver actuates the accelerator pedal with great variations in short successions, it is expedient that an additional torque M_DOWN_CORR is determined in response to the speed of application of the accelerator pedal and the number of applications of the accelerator pedal during a predetermined time period, said additional torque being considered in the starting aid.

It is favorable that the additional or correction torque is so considered in the balancing operation that the additional torque M_DOWN_CORR is summed with the downgrade torque M_SLOPE.

Embodiments of the invention are shown in the accompanying drawings and will be described in detail in the following.

BRIEF DESCRIPTION OF THE DRAWINGS

In the drawings,

FIG. 2 is a diagram according to FIG. 1 in a tolerance band with a process run in the activation branch of FIG. 1a.

FIG. 2a is a diagram according to FIG. 1 with a process run in the starting branch of FIG. 1a.

FIG. 5 is a diagram relating to the starting operation, with the quantities engine torque, engine rotational speed, driving torques.

DETAILED DESCRIPTION OF THE DRAWINGS

Figure 1:
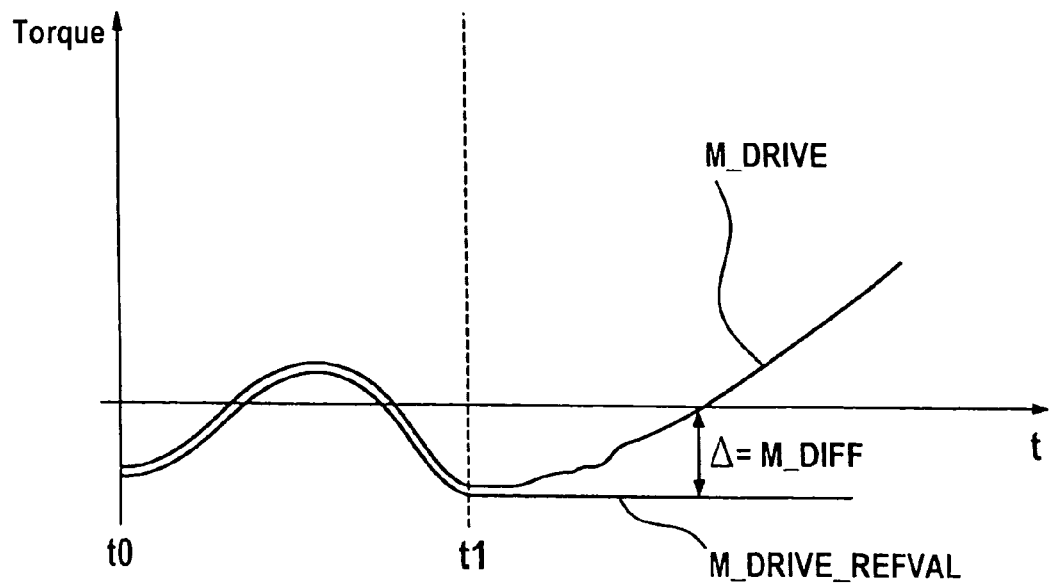
FIG. 1 is a diagram showing the time variation of the estimated vehicle driving torque and the vehicle driving torque reference value.

FIG. 1 shows a diagram regarding the time variation of the driving torque M_DRIVE and the driving torque reference value M_DRIVE_REVAL. In this arrangement, the reference value M_DRIVE_REVAL follows the driving torque M_DRIVE until the time t1 where the service brake and/or the parking brake is released.

The reference value will follow during the time period t0 to t1 when the driver does not show the desire to start because he/she applies the service brake or the parking brake is applied. In situations where the driver can potentially develop driving torque, the reference value M_DRIVE_REFVAL is appropriately retained in order that the starting desire of the driver during which M_DRIVE rises compared to the reference value M_DRIVE_REFVAL is recognized. It is possible for the driver to build up driving torque according to an embodiment when the service brake and the parking brake are released.

As this occurs, it is not the absolute quantity of the driving torque M_DRIVE that is taken into account for the balancing operation in relation to the downgrade torque in the starting maneuver with a view to appropriately reducing the brake torque, but only the variation of the driving torque M_DRIVE with respect to the reference value M_DRIVE_REFVAL to be determined is taken into consideration. The estimated driving torque is evaluated in relation to the reference value because of difference M_DIFF=M_DRIVE−M_DRIVE REFVAL>M_START, wherein M_START=starting threshold describing the desire to drive off.

After the driver's desire to start has been detected, the brake torque is influenced by way of a balancing operation from M_DIFF to M_SLOPE.

Figure 1A:
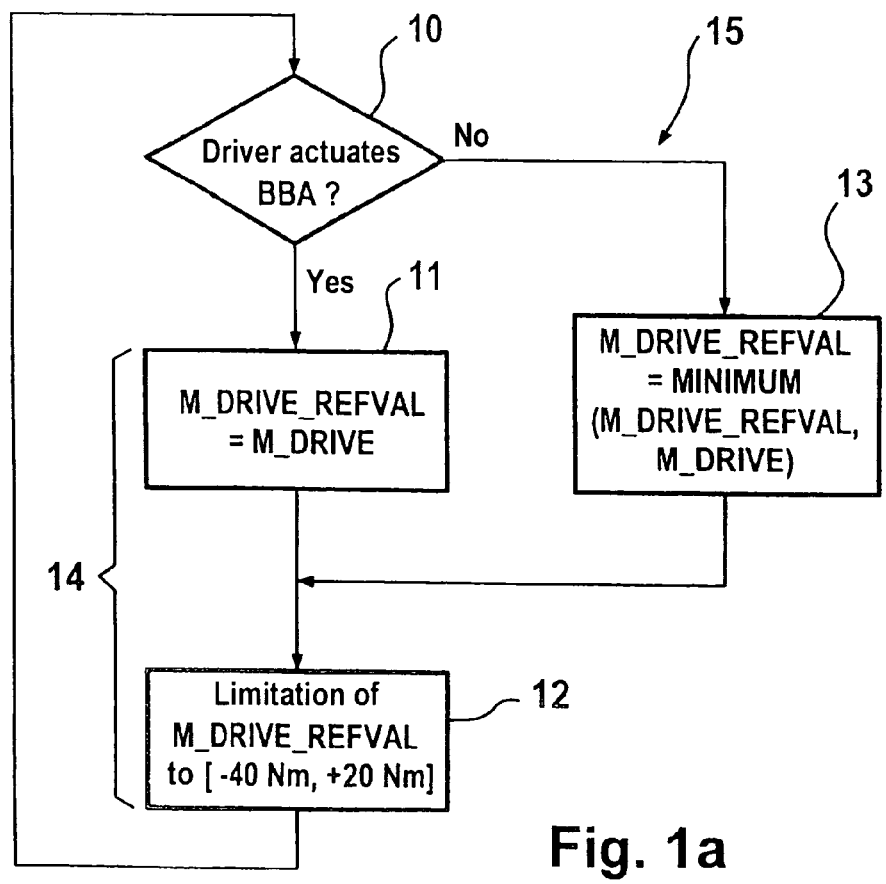
FIG. 1a is a diagram showing the process run according to FIG. 1.

FIG. 1a focuses on the process run. The illustrated run permits making a distinction between the starting situation and the situation where the vehicle stands still. Starting from a situation, it is found out in lozenge 10 whether the driver applies the service brake, or the parking brake is or is not applied. When a signal prevails indicating a vehicle standstill and a simultaneous brake application, a follow-up control is commenced in activation branch 14 in step 11 that the reference value M_DRIVE_REFVAL follows the driving torque M_DRIVE. When the state adjusted in step 11 prevails, the reference value will be limited in step 12 to a top and bottom limit value G_TOP, G_BOTTOM. Preferably, G_TOP amounts to roughly 20 Nm and G_BOTTOM to roughly −40 Nm, with the limit values varying in response to the vehicle.

When it is detected in lozenge 10 that the brake(s) was(were) released, it will be found out by a comparison of dimensions in drive-off branch 15 in step 13 whether the current value of the driving torque M_DRIVE is smaller than the reference value M_DRIVE_REFVAL. The reference value M_DRIVE_REFVAL of the vehicle driving torque is then adapted to the variations of the driving torque or also kept constant in dependence on further quantities or parameters or test values or their derivatives, such as quantities indicative of the application of the accelerator pedal and/or the instantaneous vehicle condition (standstill, starting to drive, cranking the engine, engine rotational speed, etc.).

Figure 2:
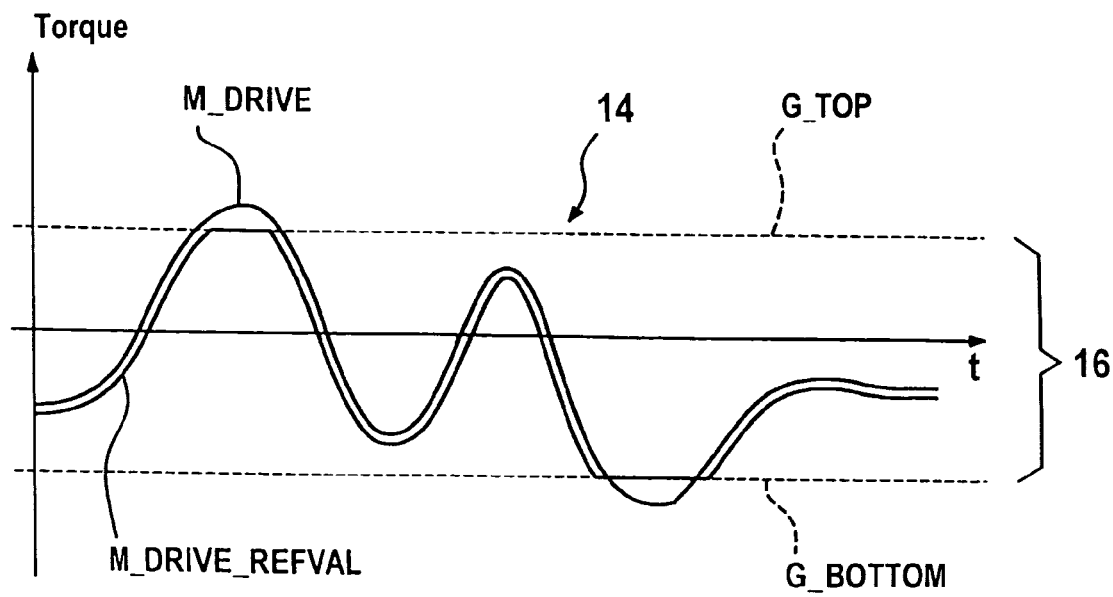

The reference value M_DRIVE_REFVAL is produced as follows for the relative evaluation of the driving torque M_DRIVE:

As FIG. 2 shows, the reference value M_DRIVE_REFVAL is conformed to the determined value of the driving torque M_DRIVE, i.e. M_DRIVE_REFVAL=M_DRIVE, as long as the driver has actuated a braking device. The reference value M_DRIVE_REFVAL follows the value of the driving torque M_DRIVE within a tolerance band 16 that is limited to physically appropriate values by a top limit value G_TOP and a bottom limit value G_BOTTOM. When the value of the driving torque M_DRIVE exceeds or falls below the top or bottom limit value G_TOP, G_BOTTOM of the tolerance band 16, then reference value M_DRIVE_REFVAL is kept to the limit value. The driver is then unable to start whenever he/she maintains one of the two braking devices (service brake and/or parking brake) actuated. The activation branch 14 is passed through in the starting aid algorithm in this case. When the driver no longer actuates the service brake device or the actuation of the parking brake is no longer considered effective in view of the constellation and the sequence of different vehicle signals (FIG. 2a), the drive-off branch 15 in the algorithm is passed through and M_DRIVE_REFVAL must not be increased with M_DRIVE but only with limited gradients, because otherwise it is impossible to detect a starting condition. An increase with a limited gradient is described more closely in connection with FIG. 7.

Figure 3:
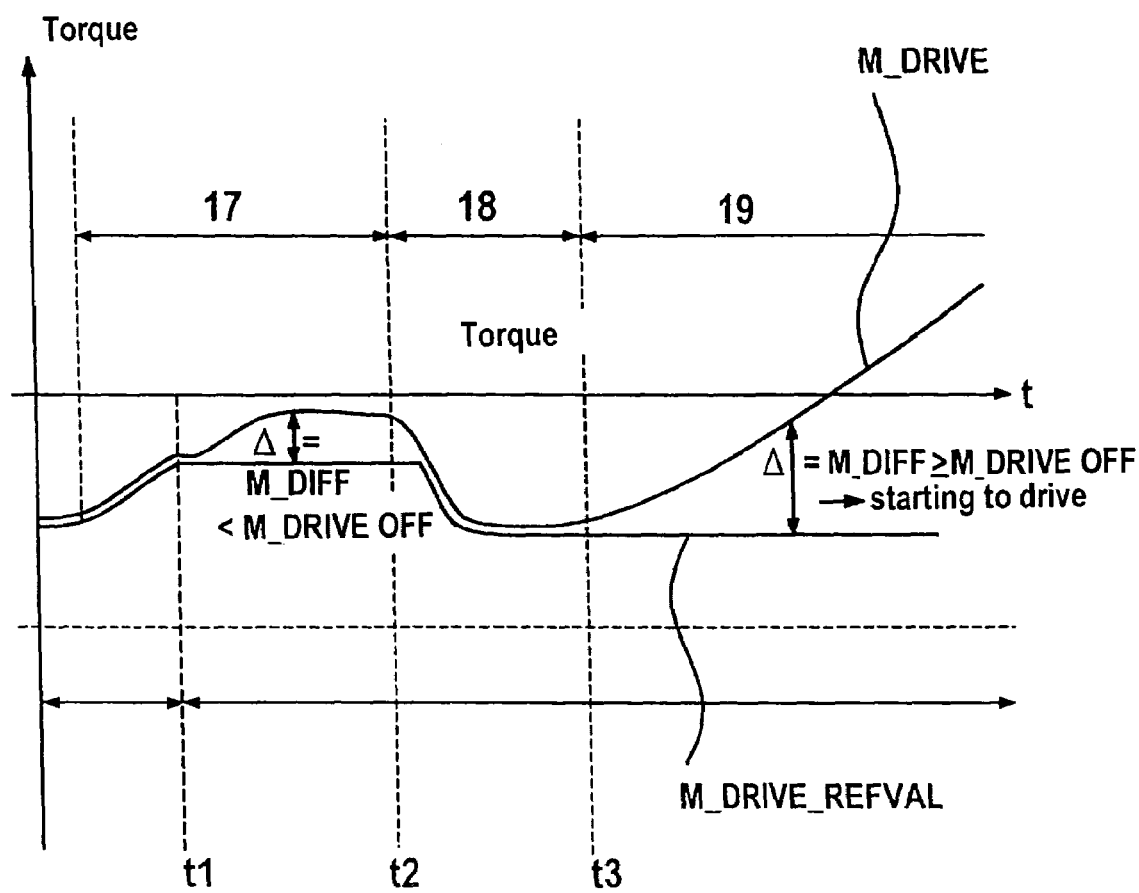
FIG. 3 is a diagram according to FIG. 1 in which a process run with interrupted drive-off is illustrated.

For reasons of clarity, the adaptation with limited gradients is illustrated in FIGS. 1, 2 and 3 in a simplified fashion as a constant value of the quantity M_DRIVE_REFVAL.

The special case is an applied parking brake. In this case the driver is permitted to drive-off even in opposition to the parking brake, especially when he/she has applied the parking brake only slightly (e.g. first catch). The result of a permanent adaptation (as described above) of M_DRIVE_REFVAL to M_DRIVE would be that the driver's desire to start would never be detected. Therefore, the adaptation of M_DRIVE_REFVAL is executed only until a physically appropriate limit of roughly 20 Nm (or the driver applies the accelerator pedal). On the one hand, it is achieved thereby that the errors in the estimation of the driving torque are sufficiently eliminated in this relative evaluation and, on the other hand, starting to drive in opposition to the parking brake is now as before possible.

Further limitation of M_DRIVE_REFVAL in a downward direction to physically appropriate values of the possible errors amounts to roughly −40 Nm in a particularly favorable embodiment. This provides in total a sufficient band (−40 Nm to 20 Nm) for the relative viewing of M_DRIVE. On the other hand, however, adaptation of M_DRIVE_REFVAL to physically inappropriate values is prevented and, hence, a possibly faulty performance of the starting aid. The driver's desire to start can still be detected, even in the error case, if more than 20 Nm develop.

Figure 2A:
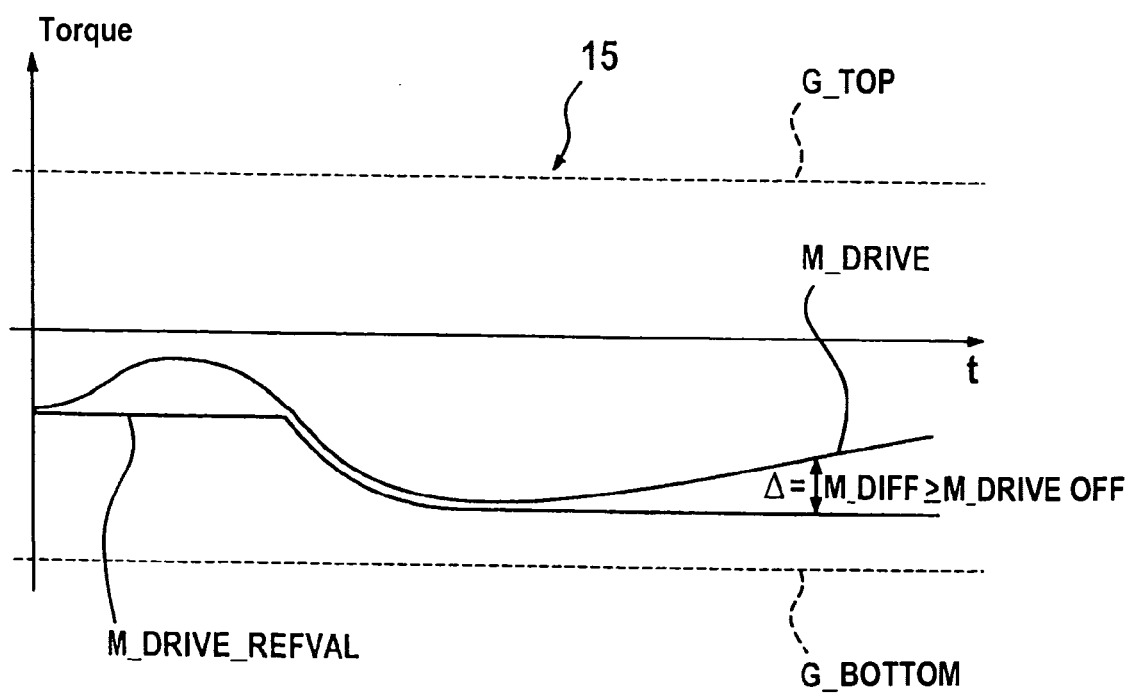

As shown in FIGS. 2a and 3, the reference value M_DRIVE_REFVAL in the drive-off branch 15 is allowed to be adapted downwards with a declining driving torque M_DRIVE (until the limit value G_BOTTOM). This feature takes into consideration the following vehicle condition or the following situation: When the driver builds up driving torque by way of the clutch until time t1, despite the service brake being actuated, M_DRIVE_REFVAL follows M_DRIVE until maximally G_TOP, as described above. When the driver releases the brake at time t1, reference value M_DRIVE_REFVAL is maintained at the current reference value, and the driver must continue building up driving torque from this level on until M_DIFF≧M_START in order to be able to reduce the braking torque by way of the starting aid. The adaptation up to maximally G_TOP makes the driver sense this performance only as an insignificant loss in comfort, yet renders starting to drive possible.

As is shown in FIG. 3, the driver will stop the starting maneuver 17 when a vehicle condition M_DIFF<M_START prevails at point of time t2 until which he/she has built up driving torque by way of the clutch. The driver disengages the clutch at time t2 so that the starting maneuver is interrupted at 18, and the driving torque is reduced in the direction of the limit value G_BOTTOM. As this occurs, the above-described adaptation of M_DRIVE_REFVAL to the driving torque in the direction of the bottom limit value G_BOTTOM prevents the use of the previously learnt (excessive) value of M_DRIVE_REFVAL for the relative evaluation in the event of a new starting maneuver 19. Drive-off detection will then again be based on the lower value for M_DRIVE_REFVAL adapted in a downward direction.

Reference value M_DRIVE_REFVAL must be retained when the driver steps on the gas. The estimation of the driving torque may then be faulty, especially in the case of very dynamic actions (quick stepping on the gas or quick taking off the gas). Adaptation of the reference value M_DRIVE_REFVAL is avoided due to this insecurity in order to prevent spurious release of the starting aid or a resistant release of the brake pedal.

Figure 4:
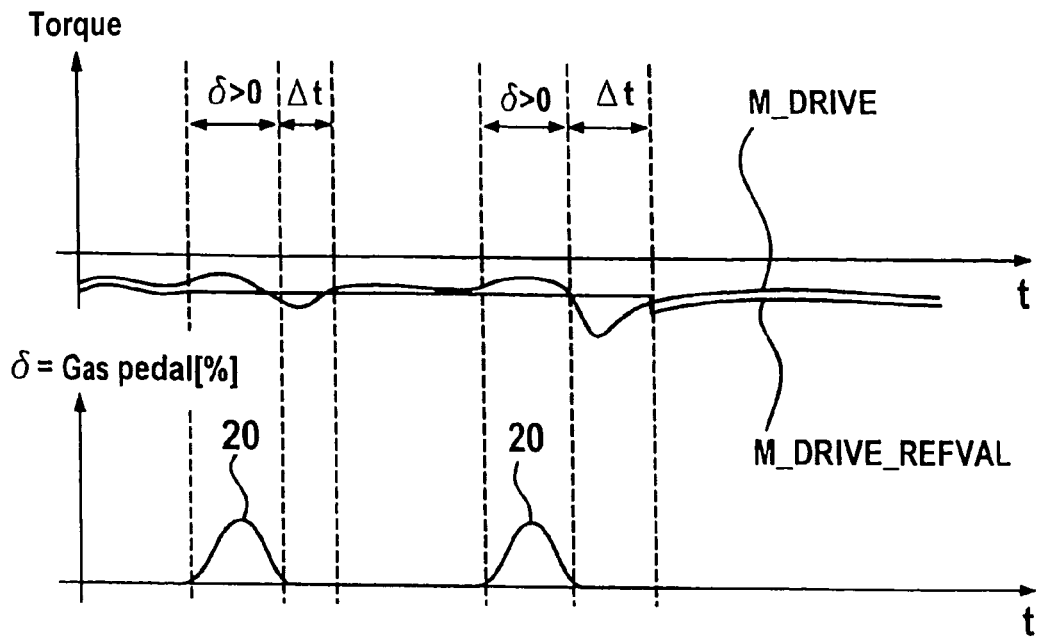
FIG. 4 is a diagram according to FIG. 1 in which a process run with a dynamic accelerator pedal application is illustrated.
Figure 4A:
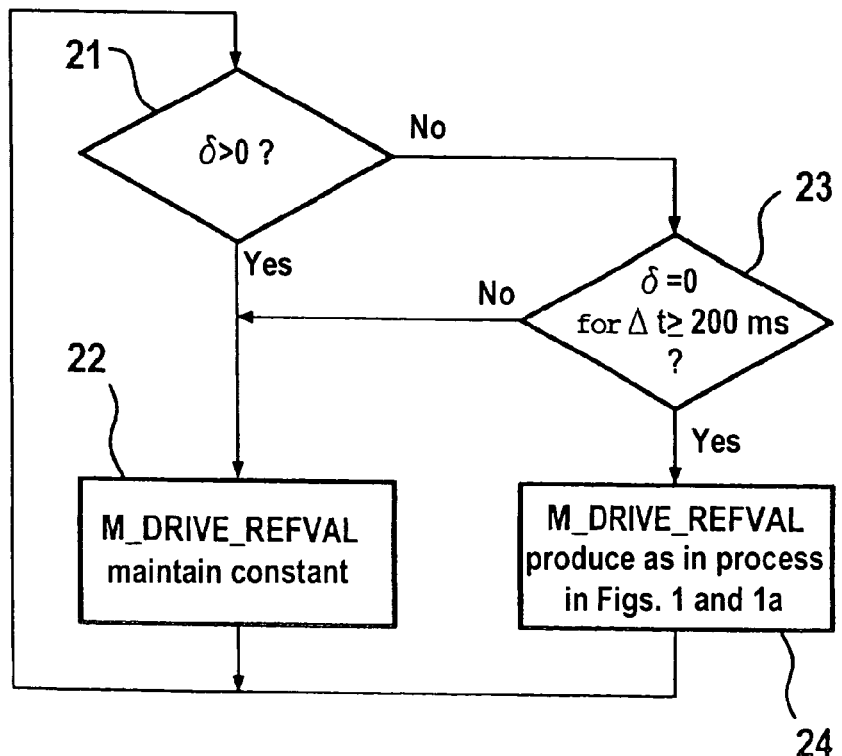
FIG. 4a is a diagrammatic plan showing the process run according to FIG. 4.

FIG. 4 shows a diagram relating to the time variation of the driving torque reference value M_DRIVE_REFVAL according to a dynamic accelerator pedal application. In a particularly favorable embodiment, the reference value M_DRIVE_REFVAL is maintained constant on the current value after release of the accelerator pedal 20 at $\delta=0$ ($\delta$=accelerator pedal application in %) during a predetermined time period $\Delta t$ (e.g. 200 ms–3000 ms). This allows the estimation of the driving torque to oscillate. FIG. 4a deals with the process run. The illustrated run permits detecting the situation of a dynamic accelerator pedal application. It is found out in lozenge 21 whether or not the accelerator pedal application is $\delta>0$. When a signal prevails indicating an accelerator pedal application greater than 0, the reference value is maintained in step 22 on a value of M_DRIVE when a brake pedal was applied. When the signal of the accelerator pedal application $\delta$ is reduced to zero, it is found out in lozenge 23 whether the holding time $\Delta t$ of the reference value M_DRIVE_REFVAL has already expired. If the holding time has not yet expired, the cycle will be re-run and the reference value fixed in step 22. If the holding time has expired, the reference value will be produced in step 24 corresponding to the description of FIGS. 1 and 1a.

The result of the relative evaluation of the estimated driving torque is that the thresholds for detecting a starting maneuver are also adapted to the reference value M_DRIVE_REFVAL. This means, the thresholds that have previously been indicated as absolute are increased by the value M_DRIVE_REFVAL. The following thresholds are achieved in a particularly favorable embodiment:

Uphill drive-off: 5*drive-off threshold+M_DRIVE_REFVAL

Horizontal roadway drive-off:
2*drive-off threshold+M_DRIVE_REFVAL

Downhill drive-off: 3*drive-off threshold +M_DRIVE_REFVAL

The basic value of a detection of the starting maneuver 'drive-off threshold' in this embodiment lies in a range of 3 to 5 Nm, preferably at 3 Nm.

In general, the uphill drive-off threshold is higher than the drive-off threshold of a horizontal roadway. On the horizontal roadway, the drive-off maneuver must be recognized as quickly as possible. Uphill, however, drive-away must be prevented, and therefore the threshold must be higher. Downhill drive-away due to faulty detection of a starting condition shall be prevented, for what reason the threshold is somewhat higher than on a horizontal roadway.

Thus, the detection of a starting condition results from:
uphill: M_DIFF=M_DRIVE−M_DRIVE_REFVAL>=5*Drive-off threshold horizontal roadway: M_DIFF=M_DRIVE−M_DRIVE_REFVAL>=2*Drive-off threshold downhill: M_DIFF=M_DRIVE−M_DRIVE_REFVAL>=3*Drive-off threshold.

The balancing operation with the downgrade torque in the starting maneuver with the relative evaluation of the driving torque will then look as follows:

uphill: M_SUM=(M_BRAKE+M_DIFF)>M_SLOPE

On a horizontal roadway and downhill, M_DIFF can be evaluated as a trigger event for quick release of the brake. M_DIFF, however, may also be favorably used for weighting the release speed of the brake torque after a starting condition has been detected.

There are starting aids with activation conditions that are application of the service brake by the driver and, alternatively, actuation of the parking brake. This ensures that the driver can board a parked vehicle, engage the clutch, crank the engine, release the parking brake and be assisted by the activated starting aid when starting to drive on a slope. As this occurs, the brake torque in the service brake is solely generated by the active service brake rather than by the driver. Consequently, this renders activation immediately after the starting of the engine necessary.

The estimation of the driving torque is very faulty, especially according to the description in WO99/20921, because the input quantities for the driving torque determination are very faulty when the engine is starting and shortly afterwards. With the first rotations of the engine, the engine rotational speed measured differs greatly from the actual rotational speed, and the engine torque supplied by the engine control device differs greatly from the actually applied engine torque. Therefore, the tolerance band 16 for limiting the reference value M_DRIVE_REFVAL is increased beginning with the start of the vehicle over a predetermined time period, as illustrated in FIG. 5. Starting of the vehicle in this context refers to the time required from the ignition re-start of the engine until a stable idling performance of the engine without starter is reached. It is thereby achieved that M_DRIVE_REFVAL in the starting phase can be adapted to the faulty M_DRIVE and no faulty starting condition is detected. FIG. 5 shows a diagram relating to the time variation of the estimated vehicle driving torque and the vehicle driving torque reference value according to the engine torque and the engine speed provided by the control device during the starting phase. After the starting phase, the top limit value G_TOP of the tolerance band 16 is raised to a value of preferably 100 Nm for a period ranging between 1 to 2 seconds, preferably one second. Of course, the value can be modified in a vehicle-related manner, e.g. by means of parameters. Upon expiry of the predefined period $\Delta t1$, during which the tolerance band was extended, the raised limit value is returned to the limit value G_TOP at the point of time t3 for a period $\Delta t2$ of 1 to 2 seconds.

Figure 6:
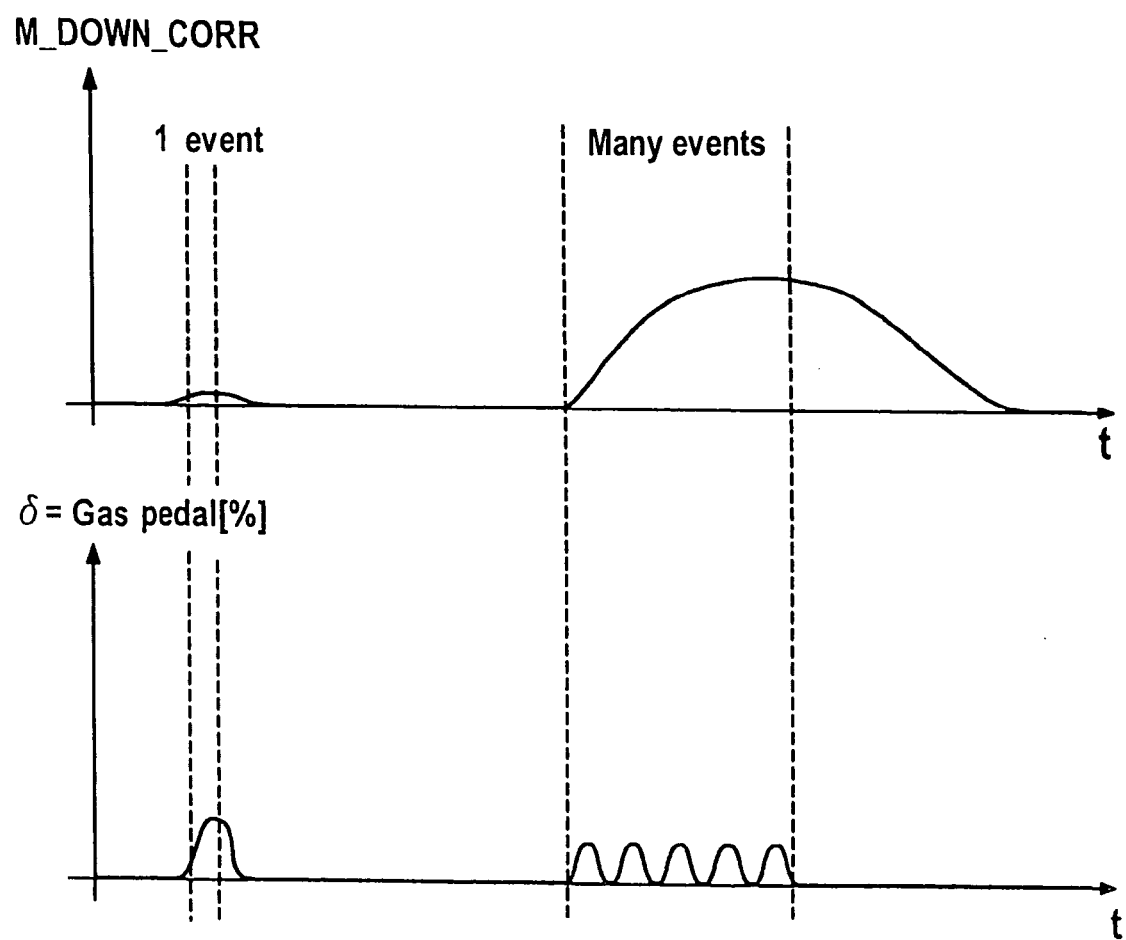
FIG. 6 is a diagram with respect to the time variation of an additional torque in response to the accelerator pedal actuation.

The estimation of the driving torque M_DRIVE may also become faulty when the driver applies the accelerator pedal very quickly and frequently (i.e. 'plays' with the gas pedal). In doing so, the driver predefines great variations in rapid successions at the accelerator pedal. These highly dynamic variations of the engine speed will mostly cause a rising estimation of the driving torque M_DRIVE although no or only little driving torque is actually available. It is necessary in this situation that a correction torque is included in the balancing operation for reducing the brake torque. FIG. 6 shows a diagram about the time variation of the determined additional torque M_DOWN_CORR in accordance with the speed of application of the accelerator pedal and the number of applications of the accelerator pedal. Thus, an additional torque M_DON_CORR is determined which detects said 'playing' at the gas pedal, which classifies the extent of the change of the degree of actuation at the gas pedal and is input into a memory (filter). Said filter ensures that a single event (actuate gas pedal vigorously one time, e.g. when quickly driving off with much gas) causes only a small negligible correction torque. A frequent, vigorous actuation in rapid successions, however, causes a greater additional correction torque. The filter provides for an oscillation of M_DOWN_CORR in consecutive events and a decay of M_DOWN_CORR in the absence of said events. Faulty detection of a starting condition is thus avoided, and the vehicle will not roll away in opposition to the desired driving direction. The method for determining the additional torque M_DOWN_CORR is characterized by the following steps:

1. step:
determining the accelerator pedal actuating speed in %

$$\Delta\_gas\_ped = \frac{\delta(n) - \delta(n-1)}{\Delta T_{Loop}}$$

with a change per cycle (loop) or alternatively with changes over several loops.

2. step:

classifying the changes in

<5%/loop—nothing(X)→M_CORR_noth=0 Nm

>5%/loop—small(S)→M_Corr_min=10 to 50 Nm, preferably 35 Nm

≧10%/loop—middle(M)→M_Corr_mid=50 to 150 Nm, preferably 75 Nm

>20%/loop—big(B)→M_Corr_max=150 to 400 Nm, preferably 300 Nm.

3. step:
The classified events are stored with the class in a register (dead time pipeline). For example, a register with the following sequence of events is produced:

xxx . . . xBxMS, wherein the dead time of the register corresponds to the number of events multiplied by $T_{Loop}$. S represents the signal of the current point of time.

4. step:
In this step the events are shifted by one loop to the left (shift).

5. step:
The event, which was shifted to the left in the register, is filtered in a filter (preferably $PT_1$-filter). In the present case, X⇒M_CORR_NOTH=0 Nm X→$PT_1$-filter→M_DOWN_CORR.

The so determined M_DOWN_CORR will then be included in the balancing operation as follows:

uphill: M_SUM=(M_BRAKE+M_DIFF)>=M_SLOPE+M_DOWN_CORR

Downhill M_DOWN_CORR is only included in the release process of the brake torque when the speed of brake torque reduction is influenced by M_DIFF as described hereinabove.

Figure 7:
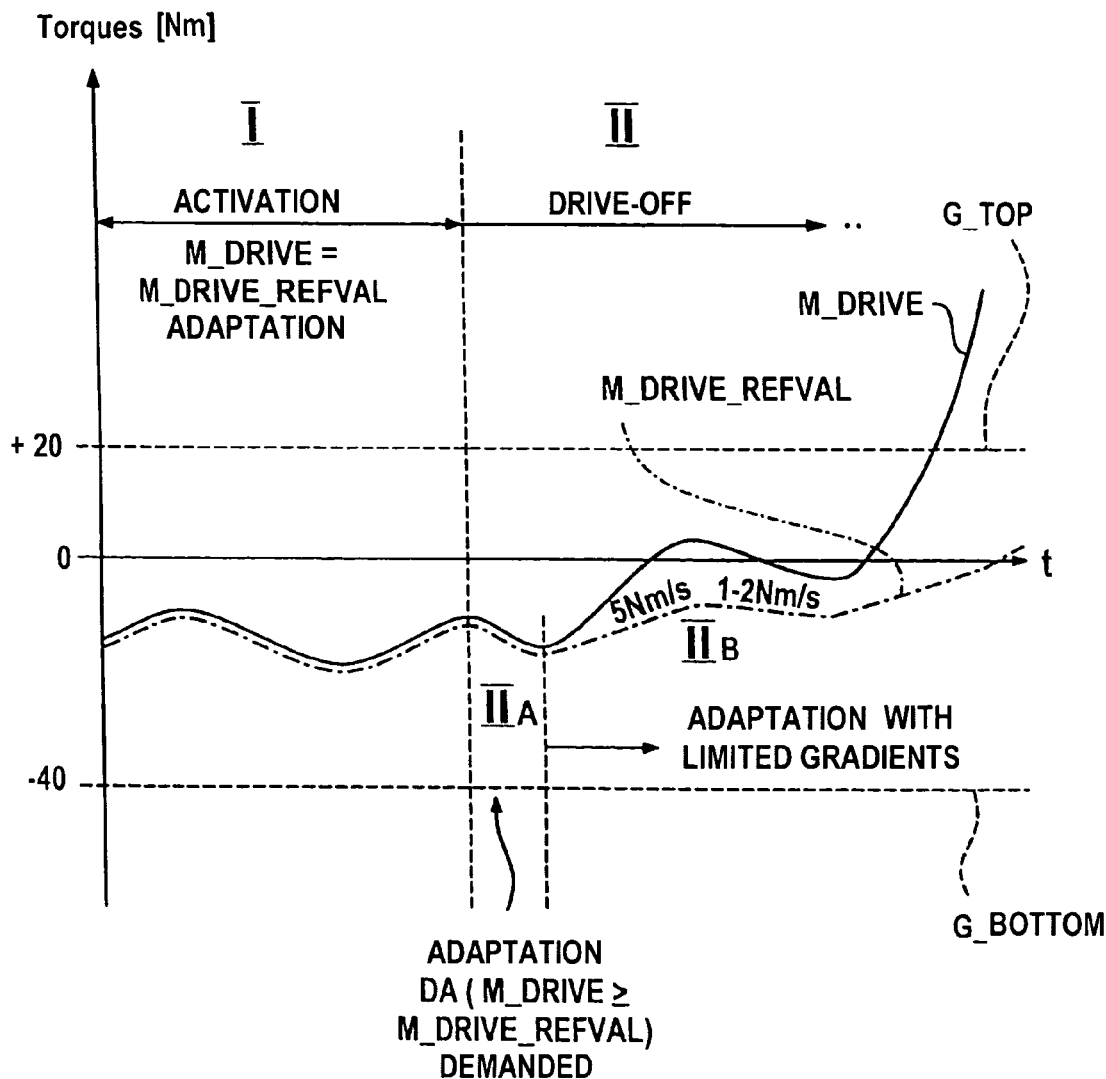
FIG. 7 is a diagram according to FIG. 1 in which the reference value with a limited gradient is adapted.

To avoid that additional electric and mechanical loads, which cannot be taken into consideration in the model-based determination of the driving torque, cause an inadvertent deactivation of the starting aid, the reference value M_DRIVE_REFVAL within its tolerance band 16 can be adapted in the direction of higher and lower values in the drive-off branch as long as the driver does not apply the accelerator pedal, with the speed of this adaptation becoming limited (FIG. 7). In typical starting maneuvers where a relatively quick time variation of M_DRIVE is assumed, it is desired to prevent any noticeable retardation of the starting maneuver by way of an adaptation of M_DRIVE_REFVAL that is limited in its speed. When there are changes of the load condition of the combustion engine by connecting or disconnecting electric or mechanical consumers, however, a slow change of M_DRIVE or a change reduced in its absolute magnitude is assumed. M_DRIVE_REFVAL can better follow this slow change of M_DRIVE due to the measure taken than the relatively quick changes during a starting maneuver. To achieve an additional security against inadvertent deactivation, M_DRIVE_REFVAL is adapted with a higher admissible speed (typically 5 Nm/s) in the direction of higher values than in the direction of lower values (typically 1.2 Nm/s).

This renders any deactivation on account of switching a load that is not desired by the driver less likely, and the advantages of the relative evaluation of the driving torque are achieved now as before.

The invention claimed is:

1. A method for assisting a vehicle to start on a slope, wherein a vehicle brake torque is changed corresponding to an estimated vehicle driving torque in consideration of a downgrade torque, comprising the steps of determining a vehicle driving torque reference value, wherein the vehicle driving torque reference value is determined in accordance with the vehicle driving torque,
comparing the reference value with the estimated vehicle driving torque, and influencing the brake torque in accordance with the comparison result.

2. The method as claimed in claim 1,
wherein the reference value of the vehicle driving torque is evaluated in dependence on quantities indicative of an instantaneous vehicle condition.

3. The method as claimed in claim 1,
wherein the vehicle driving torque reference value is adapted until the brake pedal is released.

4. The method as claimed in claim 1,
wherein the vehicle driving torque reference value is adapted until a parking brake is released.

5. The method as claimed in claim 1,
wherein the vehicle driving torque reference value within a tolerance band is adapted to the vehicle driving torque.

6. The method as claimed in claim 5,
wherein the vehicle driving torque reference value within the tolerance band follows the vehicle driving torque to a bottom tolerance band limit value when at least the brake pedal was released.

7. The method as claimed in claim 5,
wherein the vehicle driving torque reference value within the tolerance band follows the vehicle driving torque in dependence on the accelerator pedal quantity until a bottom tolerance band limit value when at least the brake pedal has been released.

8. The method as claimed in claim 7,
wherein the vehicle driving torque reference value is adapted towards the bottom tolerance band limit value only after a predefined time period, with said time period being started in dependence on the accelerator pedal quantity.

9. The method as claimed in claim 7,
wherein the vehicle driving torque reference value is adapted towards the bottom tolerance band limit value only after a predefined time period, with said time period being started in dependence on a limit value of the engine rotational speed.

10. The method as claimed in claim 5,
wherein limited gradients for the adaptation of the vehicle driving torque reference value are determined according to the variation of the vehicle driving torque.

11. The method as claimed in claim 10,
wherein the vehicle driving torque reference value within the tolerance band follows the vehicle driving torque with the limited gradients until a top tolerance band limit value when the brake pedal has been released.

12. The method as claimed in claim 10,
wherein the vehicle driving torque reference value within the tolerance band follows the vehicle driving torque with the limited gradients until a bottom tolerance band limit value when the brake pedal has been released.

13. The method as claimed in claim 10,
wherein the vehicle driving torque reference value follows the vehicle driving torque with limited gradients to a top or bottom tolerance band limit value only if an accelerator pedal quantity represents an instantaneous vehicle condition in which the accelerator pedal is released.

14. The method as claimed in claim 10,
wherein the vehicle driving torque reference value follows the vehicle driving torque with limited gradients to a top tolerance band limit value only if the engine rotational speed falls below a limit value.

15. The method as claimed in claim 5,
wherein the vehicle driving torque reference value is adapted to the vehicle driving torque when the vehicle driving torque moves in the direction of a bottom limit value of the tolerance band and continuously falls below the value of the vehicle driving torque.

16. The method as claimed in claim 1,
wherein, when starting the vehicle, the starting assistance is initiated automatically when entry conditions prevail that are derived from vehicle conditions, and that at least a top tolerance band limit value for a vehicle driving torque reference value is raised during starting for a time period.

17. The method as claimed in claim 1,
wherein a M_DOWN_CORR is determined in response to a value representative of the speed of application of an accelerator pedal and the number of applications of the accelerator pedal during a predetermined time period, said additional torque being considered in the starting assistance.

18. The method as claimed in claim 17,
wherein the additional torque M_DOWN_CORR is summed with a downgrade torque M_SLOPE.

19. A device for assisting a vehicle to start on a slope, wherein a vehicle brake torque is changed corresponding to an estimated vehicle driving torque in consideration of a downgrade torque, including a determining unit for determining a vehicle driving torque reference value, a comparing unit for comparing the reference value with the estimated vehicle driving torque, and a device for influencing the brake torque in accordance with the comparison result, wherein the determining unit determines the vehicle driving torque reference value in accordance with the vehicle driving torque.

20. The device as claimed in claim 19,
wherein the determining unit evaluates the vehicle driving torque reference value also in dependence on further measured variables representative of an instantaneous vehicle condition.

21. The device as claimed in claim 19,
wherein the determining unit makes the vehicle driving torque reference value within a tolerance band follow the vehicle driving torque until a release signal of the brake pedal prevails.

* * * * *